US00RE37859E

(19) United States
(12) Reissued Patent
Lior et al.

(10) Patent Number: US RE37,859 E
(45) **Date of Reissued Patent: *Sep. 24, 2002**

(54) DEVELOPMENT CONTROL SYSTEM

(75) Inventors: Ishaiu Lior, Rehovot; Ehud Chatow, Raanana; Amiran Lavon, Bat Yam, all of (IL)

(73) Assignee: Indigo N.V., Maastright (NL)

( * ) Notice: This patent is subject to a terminal disclaimer.

(21) Appl. No.: 09/544,820

(22) PCT Filed: Feb. 3, 1994

(86) PCT No.: PCT/NL94/00027

§ 371 (c)(1),
(2), (4) Date: Apr. 4, 1996

(87) PCT Pub. No.: WO95/10801

PCT Pub. Date: Apr. 20, 1995

Related U.S. Patent Documents

Reissue of:
(64) Patent No.: 5,737,666
Issued: Apr. 7, 1998
Appl. No.: 08/615,187
Filed: Apr. 4, 1996

U.S. Applications:

(63) Continuation-in-part of application No. 08/464,851, filed on Aug. 17, 1995, now Pat. No. 5,610,694, and application No. 08/434,236, filed on May 4, 1995, now Pat. No. 5,596,396, which is a continuation of application No. 08/170,347, filed as application No. PCT/NL91/00243 on Nov. 29, 1991, now Pat. No. 5,436,706, which is a continuation-in-part of application No. 07/727,599, filed on Jul. 9, 1991, now abandoned.

(30) Foreign Application Priority Data

Oct. 8, 1993 (IL) ..... 107217

(51) Int. Cl.[7] ..... G03G 15/10

(52) U.S. Cl. ..... 399/57; 399/240

(58) Field of Search ..... 399/57, 237, 239, 399/240, 241, 249; 430/117

(56) References Cited

U.S. PATENT DOCUMENTS

| | | | |
|---|---|---|---|
| 3,758,204 | A | 9/1973 | Mochizuki |
| 3,814,054 | A | 6/1974 | Tajihi |
| 3,863,603 | A | 2/1975 | Buckley et al. |

(List continued on next page.)

FOREIGN PATENT DOCUMENTS

| | | |
|---|---|---|
| CA | 990589 | 6/1976 |
| EP | 0226750 | 7/1987 |
| EP | 0306217 | 3/1989 |
| EP | 0481516 | 4/1992 |
| GB | 1155610 | 6/1969 |
| JP | 3-279986 | 12/1991 |

(List continued on next page.)

OTHER PUBLICATIONS

US 5,083,165, 01/1999, Landa (withdrawn)
Patent Abstracts of Japan, vol. 011, No. 002(P–532), Jan. 6, 1987. (61–179480).
Patent Abstracts of Japan, vol. 011, No. 373(P–643), Dec. 5, 1987. (62–144184).

(List continued on next page.)

*Primary Examiner*—Joan Pendegrass
(74) *Attorney, Agent, or Firm*—Fenster & Company Patent Attorneys, Ltd.

(57) ABSTRACT

Toning apparatus for toning an electrostatic latent image, having image and background portions at different potentials on an imaging surface. The apparatus comprises an endless toning surface coated with a layer of concentrated toner and engaging the imaging surface at a toning region. The apparatus additionally comprises a source: of voltage connected to the toning surface and electrifying the toning surface to a voltage operative to selectively transfer at feast a portion of the layer to image: portions on the imaging surface. A developed mass per unit area (DMA) controller having an input indicative of the DMA on the imaging surface is operative to adjust the DMA on the toning surface in response to the input.

34 Claims, 9 Drawing Sheets

U.S. PATENT DOCUMENTS

| | | | | | |
|---|---|---|---|---|---|
| 3,874,328 | A | | 4/1975 | Isonaka et al. | |
| 3,921,579 | A | | 11/1975 | Wright | |
| 3,957,016 | A | * | 5/1976 | Yamada et al. | 399/249 |
| 3,959,574 | A | | 5/1976 | Seanor et al. | |
| 3,973,699 | A | | 8/1976 | Cook | |
| 4,083,326 | A | | 4/1978 | Kroll et al. | |
| 4,089,733 | A | | 5/1978 | Zimmerman | |
| 4,180,319 | A | | 12/1979 | Kaufmann et al. | |
| 4,271,785 | A | | 6/1981 | Dinallo, Sr. et al. | |
| 4,286,039 | A | | 8/1981 | Landa et al. | |
| 4,307,168 | A | | 12/1981 | Letental et al. | |
| 4,325,627 | A | | 4/1982 | Swidler et al. | |
| 4,327,664 | A | | 5/1982 | Ohkawa et al. | |
| 4,341,461 | A | | 7/1982 | Fantozzi | |
| 4,400,079 | A | | 8/1983 | Landa | |
| 4,504,138 | A | | 3/1985 | Kuehnle et al. | |
| 4,607,940 | A | | 8/1986 | Quang | |
| 4,678,317 | A | | 7/1987 | Grossinger | |
| 4,684,238 | A | | 8/1987 | Till et al. | |
| 4,732,786 | A | | 3/1988 | Patterson et al. | |
| 4,761,357 | A | | 8/1988 | Tavernier et al. | |
| 4,794,651 | A | | 12/1988 | Landa et al. | |
| 4,833,500 | A | | 5/1989 | Mochizuki et al. | |
| 4,860,924 | A | | 8/1989 | Simms et al. | |
| 4,967,211 | A | | 10/1990 | Colby et al. | |
| 4,974,027 | A | | 11/1990 | Landa et al. | |
| 4,984,025 | A | | 1/1991 | Landa et al. | |
| 4,985,732 | A | | 1/1991 | Landa et al. | |
| 4,985,733 | A | | 1/1991 | Kurotori et al. | |
| 4,992,832 | A | | 2/1991 | Watanabe et al. | |
| 4,999,677 | A | | 3/1991 | Landa et al. | |
| 5,028,964 | A | | 7/1991 | Landa et al. | |
| 5,034,778 | A | | 7/1991 | Levanon et al. | |
| 5,047,808 | A | | 9/1991 | Landa et al. | |
| 5,089,856 | A | | 2/1992 | Landa et al. | |
| 5,166,734 | A | | 11/1992 | Pinhas et al. | |
| 5,387,760 | A | | 2/1995 | Miyazawa et al. | |
| 5,436,706 | A | | 7/1995 | Landa et al. | |
| 5,610,694 | A | * | 3/1997 | Lior et al. | 399/240 |

FOREIGN PATENT DOCUMENTS

| | | |
|---|---|---|
| JP | 4-247472 | 9/1992 |
| WO | WO 90/04216 | 4/1990 |
| WO | 9004216 | 4/1990 |
| WO | 9010896 | 9/1990 |
| WO | 9203765 | 3/1992 |
| WO | 9301531 | 1/1993 |

OTHER PUBLICATIONS

Patent Abstracts of Japan, vol. 008, No. 105(P–274), May 17, 1984. (54–15956).

Patent Abstracts of Japan. vo. 010, No. 149(P–461), May 30, 1986. (61–3160).

Patent Abstract of Japan. vol. 007, No. 180(P–215), Aug. 9, 1983. (58–82277).

Patent Abstract of Japan. vol. 017, No. 277(P–1546), May 27, 1993. (5–11584).

Patent Abstracts of Japan. vol. 005, No. 150(P–081), Sep. 22, 1981, (56–81870).

International Search Report and Annex.

Xerox Disclosure Journal, vol. No. 6, Nov./Dec. 1986, "Leak Free Developer Module", Monkelbaan, E. et al., pp. 305–306.

* cited by examiner

FIG.8
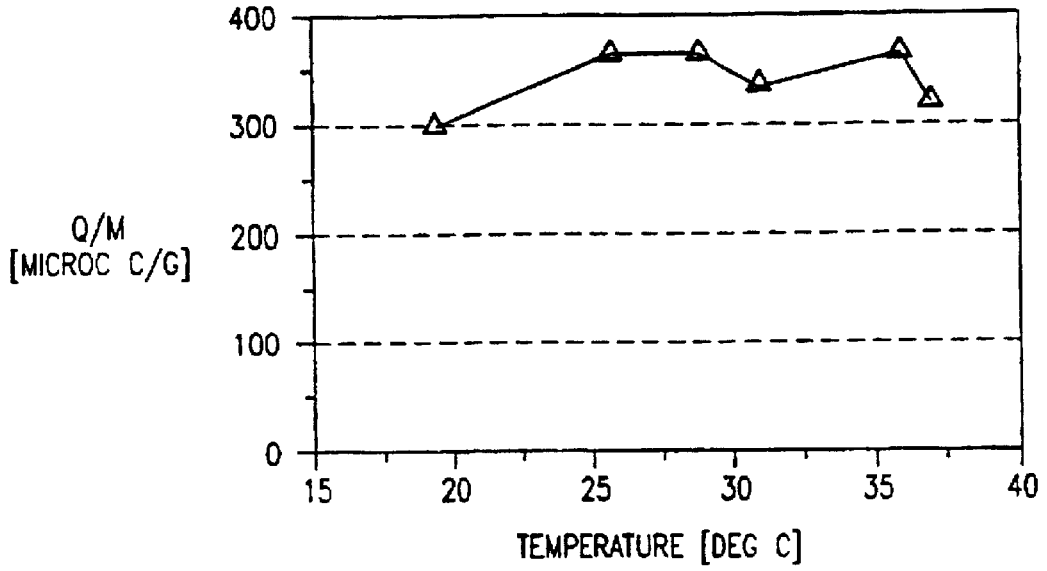
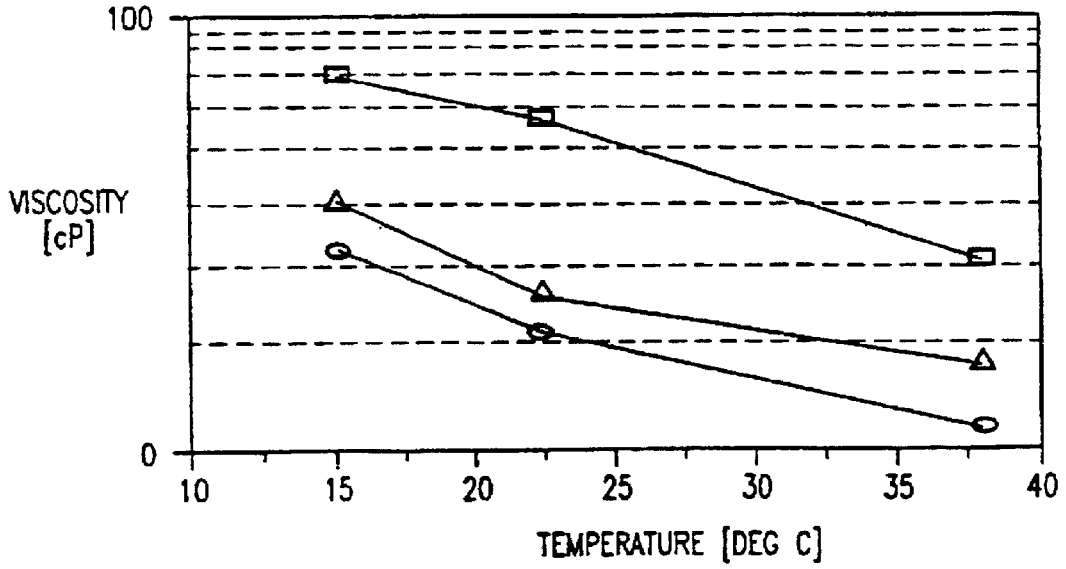
FIG.7
□ MARCOL-82 △ 2% NVS ○ 8% NVS

DEVELOPMENT CONTROL SYSTEM

Matter enclosed in heavy brackets [ ] appears in the original patent but forms no part of this reissue specification; matter printed in italics indicates the additions made by reissue.

*RELATED APPLICATIONS*

*This application is a U.S. National stage application of PCT application PCT/NL94/00027, filed Feb. 3,1994. This application is also a continuation-in-part of U.S. patent application Ser. No. 08/434,236, filed May 4, 1995, now U.S. Pat. No. 5,596,396, which is a continuation of U.S. patent application Ser. No. 08/170,347, filed Feb. 3, 1994, now U.S. Pat. No. 5,436,706, which is the national stage application of PCT application PCT/NL91/00243, filed Nov. 29 1991, and is also a continuation-in-part of U.S. patent application Ser. No. 07/727,599, filed Jul. 9, 1991, now abandoned. This application is also a continuation-in-part of U.S. patent application Ser. No. 08/464,851 filed Aug. 17,1995, now U.S. Pat. No. 5,610,694, which is the U.S. national stage application of PCT/NL93/00010, filed Jan. 11, 1993.*

FIELD OF THE INVENTION

The present invention relates to development control in elecrorostatographic imaging and, more particularly, to liquid toner development control.

BACKGROUND OF THE INVENTION

Generally, there are two types of development systems employed by electrostatographic imaging apparatus, namely, powder toner development systems and liquid toner development systems. Although powder toner is more conventional, liquid toner is often preferred for its higher intrinsic resolution. Considerable efforts have been made in the past to design more efficient and more convenient liquid toner development systems.

Liquid toner systems are sensitive to physical changes in the toner, such as changes in temperature, charge level, viscosity and liquid concentration, most of which are not relevant in powder toner systems. It is appreciated that these toner changes may affect the development level, thereby resulting in inconsistent imaging. Therefore, control of the liquid toner properties is generally considered to be crucial for maintaining a constant level of developed mass per unit area (DMA) on a photoreceptor of the imaging apparatus.

One current approach to maintaining image quality measures the optical density, volume and conductivity of the liquid toner used in the process. Based on these measurements, toner concentrate, carrier liquid a charge directs, respectively are added to the liquid toner. Such an approach is described in U.S. Pat. No. 4,860,924, the disclosure of which is incorporated herein by reference.

It is appreciated that construction and maintenance of a closed loop development system as described above is both complex and expensive. Therefore, liquid toner development systems have never been embodied in low-cost disposable cartridges, as normally is the case in powder toner systems.

In U.S. Pat. No. 4,341,461, the bias voltage of a development rolls in a powder development system la adjusted in accordance with a measurement of toner density on a developed patch on a photoreceptor. The toner density is measured by an infrared densitometer which apparently measures the optical density of the layer of toner developed on the photoreceptor.

U.S. Pat No. 4,678,317 describes a liquid toner system in which a sensor electrode is used to sense the potential of a charged photoreceptor and to adjust a development electrode voltage to compensate for variations in the sensed potential WO 93/01531, the disclosure of which is incorporated herein by reference, describes a direct-transfer liquid toner development system. A layer of concentrated liquid toner coating a toning roller is brought into virtual contact with a photoreceptor, and portions of substantially even thickness are transferred from the toning roller onto attractive portions the photoreceptor. [Either the full thickness of the portions is transferred, is a binary mode of operation or, in a quasi-binary mode of operation, a partial yet even thickness is transferred. The voltage between the toning roller and the photoreceptor determines the thickness of the layer which is transferred. In the binary mode, the DMA on the photoreceptor is substantially equal to the DMA on the toning roller and, in the quasi-binary mode, the photoreceptor DMA is dependent in a well defined manner upon the toning roller DMA. For quasi-binary transfer the photoreceptor DMA is generally more uniform than the toning roller DMA.]

The direct-transfer system described above normally employs a toner applicator and a squeegee associated with the toning roller.

SUMMARY OF THE INVENTION

It is so object of the present invention to provide an improved liquid toning system. In accordance with a preferred embodiment of the present invention, consistent toning of latent electrostatic images is maintained throughout numerous toning cycles without adding liquid toner or liquid toner components to the system and/or adjusting the material composition of the liquid toner, i.e. the ratio between toner particles and carrier liquid.

In general, liquid toner including charged toner particles and carrier liquid is contained in a sump of the toning system. The toner particles are selectively removed from the liquid toner during the toning process as they are transferred to a latent image bearing surface such as a photoreceptor. The carrier liquid is generally removed at a different rate, usually a lower rate. Thus, the percentage of toner particles in the liquid toner, hereinafter referred to as the solids concentration, rises or falls as a function of the total area toned by the toning system. For some colors, for which the proportion of printed surface to unprinted surface is small, the solids concentration may rise with time.

When either the solids concentration or the total quantity of liquid toner in the system is reduced below a pre-set value, either the sump or the entire toning system is replaced or refilled.

In accordance with a preferred embodiment of the present invention, there is thus provided a direct transfer toning system inducting an endless toning surface, preferably the surface of a toning roller charged to a predetermined voltage, coated with a lays of tone concentrate, a developed mass pet unit area (DMA) controller having an input for receiving an indication of the DMA on an imaging outface such as a photoreceptor, and adjusting the DMA on the toning surface in response to the received input, whereby the DMA on the toning roller is maintained substantially constant.

Preferably, the DMA controller controls at least one voltage which affects the DMA on the toning roller.

According to one aspect of the present invention, the input to the DMA controller is supplied by a DMA sensor which monitors the DMA on the imaging surface. Since, in direct-transfer toning systems, the DMA on the imaging surface is dependent upon the DMA on the toning rolls, by controlling the DMA on the toning roller, a consistent toning level is readily maintained.

In one embodiment of this aspect of the invention, the DMA sense includes an optical sensor which monitors the optical density (OD) on the surface of the photoreceptor or, alternatively, on the surface of the toning roller and supplies an indication of the OD to the input. In this case, the DMA controller includes a comparator which compares the signal to a value representative of a desired DMA and adjusts at least one voltage to product the desired DMA.

In accordance with another aspect of the present invention, the input to the DMA controller is generated by a solids concentration indicator responsive to the solids concentration of the liquid toner. In this aspect of the invention the development system preferably further includes apparatus for measuring the temperature of the toner. Based on the solids concentration indication and the measured toner temperature, the at least one voltage is adjusted according to a look-up table to provide the desired DMA.

According to one, preferred, embodiment of this aspect of the invention, the solids concentration indicator includes a concentration detector which measures the concentration of solids in the toner. The concentration detector may include a viscosity sensor an optical sensor, a permitivity sensor or a sensor of any other property of the tone which is related to the solids concentration.

According to another, preferred, embodiment of this aspect of the invention, the solids concentration indicator includes a concentration calculator which generates an output responsive to the total area toned by the toning system since the last refill/replacement of the toning system. Since the total toned area can be approximated by the number of toning cycles performed by the system, the concentration calculator may include a counter of the number of toning cycles performed since the last refill/replacement of the system it is appreciated that the concentration of solids is the liquid toner is substantially a function of the total area towed and, thus, only approximately, a function of the number of toning cycles performed by the system Alternatively or additionally, the proportion of printed to none-printed area on each of the cycles is calculated and the amount of carrier liquid and toner particles per page is determined. In this embodiment the concentration calculation would be improved over the concentration calculation of the previous embodiment.

In a preferred embodiment of the invention, the concentration calculator is at least partially comprised in a "smart chip" which is part of the cartridge. In this case, the smart chip stores specific concentration information for the cartridge. This allows replacement of cartridges without having to reset any counts on the computer. For example, it is sometimes useful to print with inks having special properties, such as fluorescent inks or non-process color inks. Since these cartridges are used only intermittently and must be removed when another special color is to be printed, it is very useful to have the concentration information attached to the cartridge itself.

The accuracy of the calculation of toner particle usage may be improved by using the DMA measurement to determine more accurately the amount of toner particles per unit printed area. A level detector in the sump may be used to determine the amount of liquid toner which has been removed from the sump. This determination, together with the determination of the amount of toner particles used in printing, can be used to give a very accurate determination of the concentration.

For improved development control, the liquid toner in the development system preferably includes a toner charge stabilizer operative for maintaining a substantially constant level of electric charge per unit mass (hereinafter Q/M) in the liquid toner. In a preferred embodiment, the toner charge stabilizer includes a charge director.

Further, in accordance with a preferred embodiment of the invention, the development system includes an applicator manifold for supplying liquid tone and coating the toning surface with a layer of concentrated liquid toner. A portion of the applicator manifold juxtaposed with the toning surface, hereinafter referred to as the coating electrode, is preferably charged to a relatively high voltage which aids the coating process. Preferably, the DMA controller includes apparatus for adjusting the voltage on the applicator manifold.

Preferably, the toning system includes a squeegee roller associated with the toning surface and electrified to a voltage different from that of the toning surface. Preferably, the DMA controller controls the squeegee voltage on the squeegee roller is response to the input received from the DMA monitor or the concentration indicator and the temperature sensor, in accordance with the alternative aspects of the present invention described above.

For the preferred embodiment described herein, the DMA on the toning surface is a function, inter alia of the voltages on the applicator manifold and the squeegee rolls.

In a preferred embodiment of the invention, the squeegee roller is urged against the surface of the toning roller by the action of a leaf spring. The portion of the leaf spring in contact with the squeegee roller is preferably coated with a compressible pad which is, more preferably, formed of a closed cell foam or elastomer.

In a preferred embodiment of the present invention, the toning system is embodied in a replaceable cartridge.

BRIEF DESCRIPTION OF THE DRAWINGS

The present invention will be understood and appreciated more fully from the following detailed description, taken in conjunction with the drawings in which:

FIGS. 7 and 8 are graphs showing the dependence of liquid toner viscosity and toner charge density, respectively, on toner temperature.

DETAILED DESCRIPTION OF A PREFERRED EMBODIMENT

Figure 1:
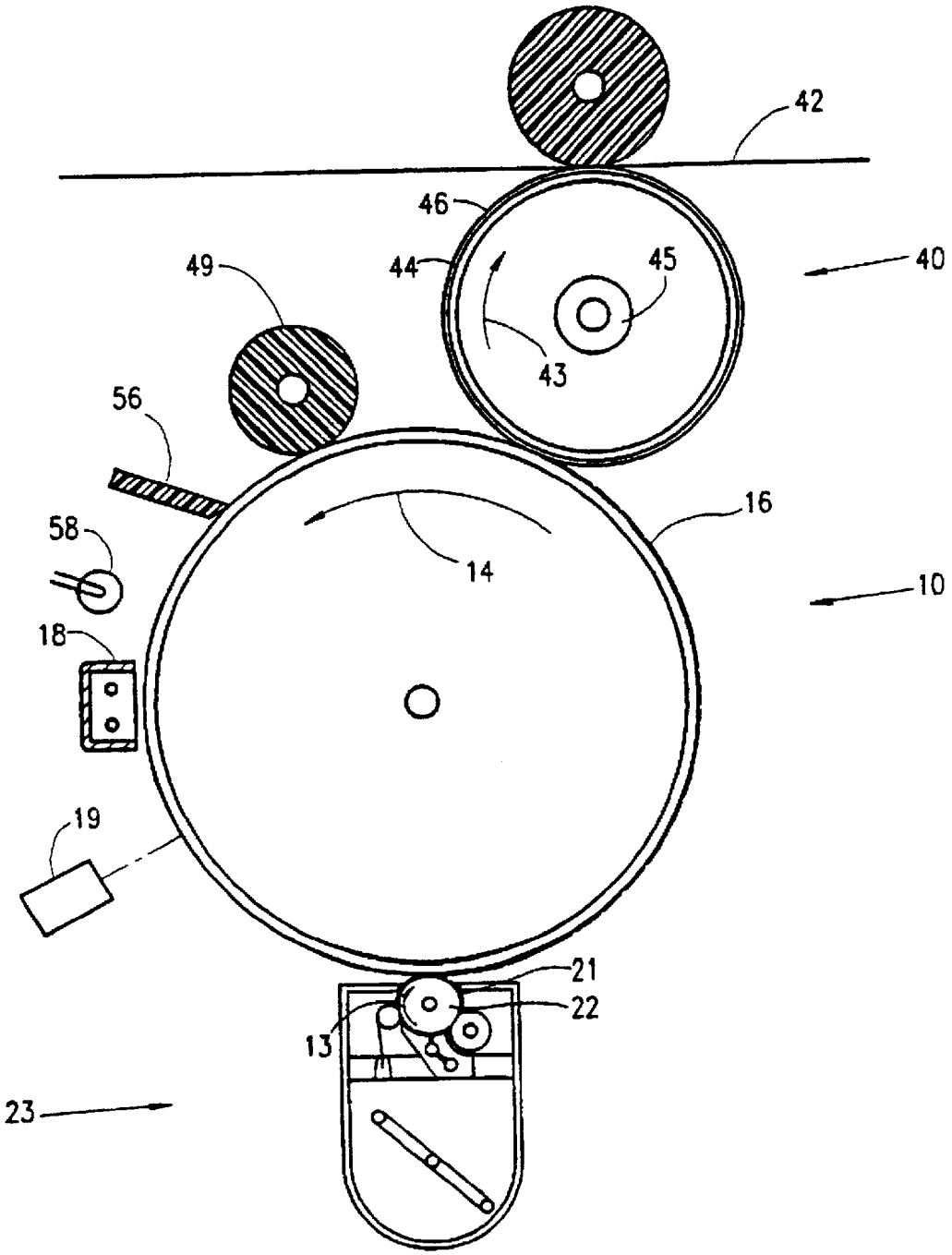
FIG. 1 is a schematic diagram of imaging apparatus constructed and operative in accordance with a preferred embodiment of the present invention.

Reference is now made to FIG. 1 which illustrates imaging apparatus constructed and operative in accordance with a preferred embodiment of the present invention.

The apparatus of FIG. 1 includes a drum 10 arranged for rotation in a direction generally indicated by arrow 14. Drum 10 is covered by as imaging surface 16 such as a cylindrical photoconductive surface made of selenium, a selenium compound, an organic photoconductor or say other suitable photoconductor known in the art.

In operation, drum 10 rotates and surface 16 is charged by a charger 18 to a generally uniform, predetermined, voltage typically on the order of −900 to −1000 volts. Charger 18 may be any type of charges known in the art, such as a corotron, scorotron or charging roller.

Continued rotation of drum 10 brings charged surface 16 into image receiving relationship with an exposure means such as a light source 19, which may be a laser or LED scanner (in the case of a printer) or the projection of an original (in the case of a photocopier). Light source 19 forms a desired electrostatic latent image on charged photoconductive surface 16 by selectively discharging portions of the photoconductive surface, image portions being at a first voltage and background portions at a second voltage. The discharged portions preferably have a voltage of between zero and about (−200) volts.

Other methods of providing an electrostatic latent image on the imaging surface (and other types of imaging surfaces) are also useful in the practice of the invention. For example the imaging surface may be an electrostatic master in which case the light source is omitted, or an ionographic or other system as is known in the art may be substituted for the photoreceptor, charger and light source.

Continued rotation of drum 10 brings charged photoconductive surface 16, bearing the electrostatic latent image, into operative engagement with the surface 21 of a toning roller 22 which is part of a toning assembly 23, more fully described blow with reference to FIGS. 3A, 3B, 4A and 4B. In a preferred embodiment of the present invention, assembly 23 is contained is a disposable cartridge which may be replaced after a preselected number of imaging cycles or after the liquid toner contained therein is effectively depleted.

Toning roller 22 rotates is a direction opposite that of drum 10, as shown by arrow 13, such that there is substantially zero relative motion between their respective surfaces at the point of contact. Surface 21 of toning roller 22 is preferably composed of a soft polyurethane material, preferably made more electrically conductive by the inclusion of conductive additives, while the bulk of toning roller 22 may be composed of any suitable electrically conductive material and preferably includes a metal core. Alternatively, drum 10 may be formed of a relatively resilient material, and in such a case surface 21 may be composed of either a rigid or compliant material.

As described below, surface 21 is coated with a thin layer of liquid toner, preferably having a high concentration of charged toner particles. In the present example the charges art assumed to be charged negatively. Developer roller 22 is charged to a voltage which is intermediate the voltage of the charged and discharged areas on photoconductive surface 16, preferably in the order of −500 to −600 volts.

When surface 21 bearing the layer of liquid toner is engaged with photoconductive surface if of drum 10, the difference in potential between toning roller 22 and surface 16 causes selective transfer of the layer of concentrated liquid toner to surface 16, thereby toning the latent image. Depending on the choice of toner charge polarity and the use of a "write-white" or "write-black" system, the layer will be selectively attracted to either the charged or discharged areas of surface 16, and the remaining portions of the toner layer will continue to adhere to surface 21. In a preferred embodiment of the invention, the concentration of toner on surface if is between 20 and 40 percent solids, more preferably between 25 and 30 percent solids.

Figure 2A:
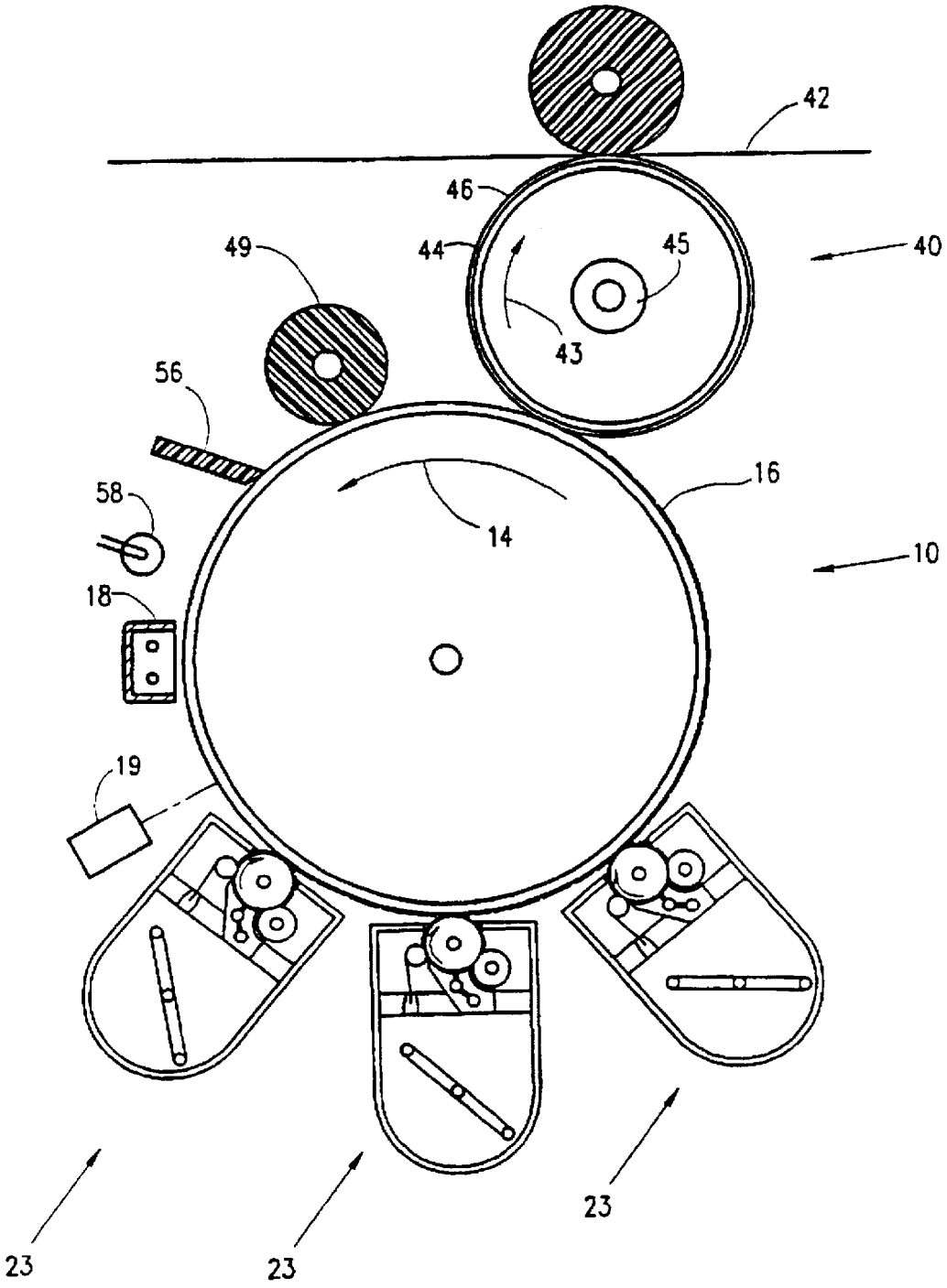
FIGS. 2A and 2B are schematic diagrams of multi-color imaging apparatus in accordance with preferred embodiments of the present invention.

For multicolor systems, as shown in FIG. 2A, a plurality of toning rollers, one for each color, are provided. The toning rollers are sequentially engaged with surface 16 to develop sequentially produced latent images. The plurality of toning rollers 22 are part of a respective plurality of toning assemblies 23, wherein each assembly includes liquid toner of a different color.

Figure 2B:
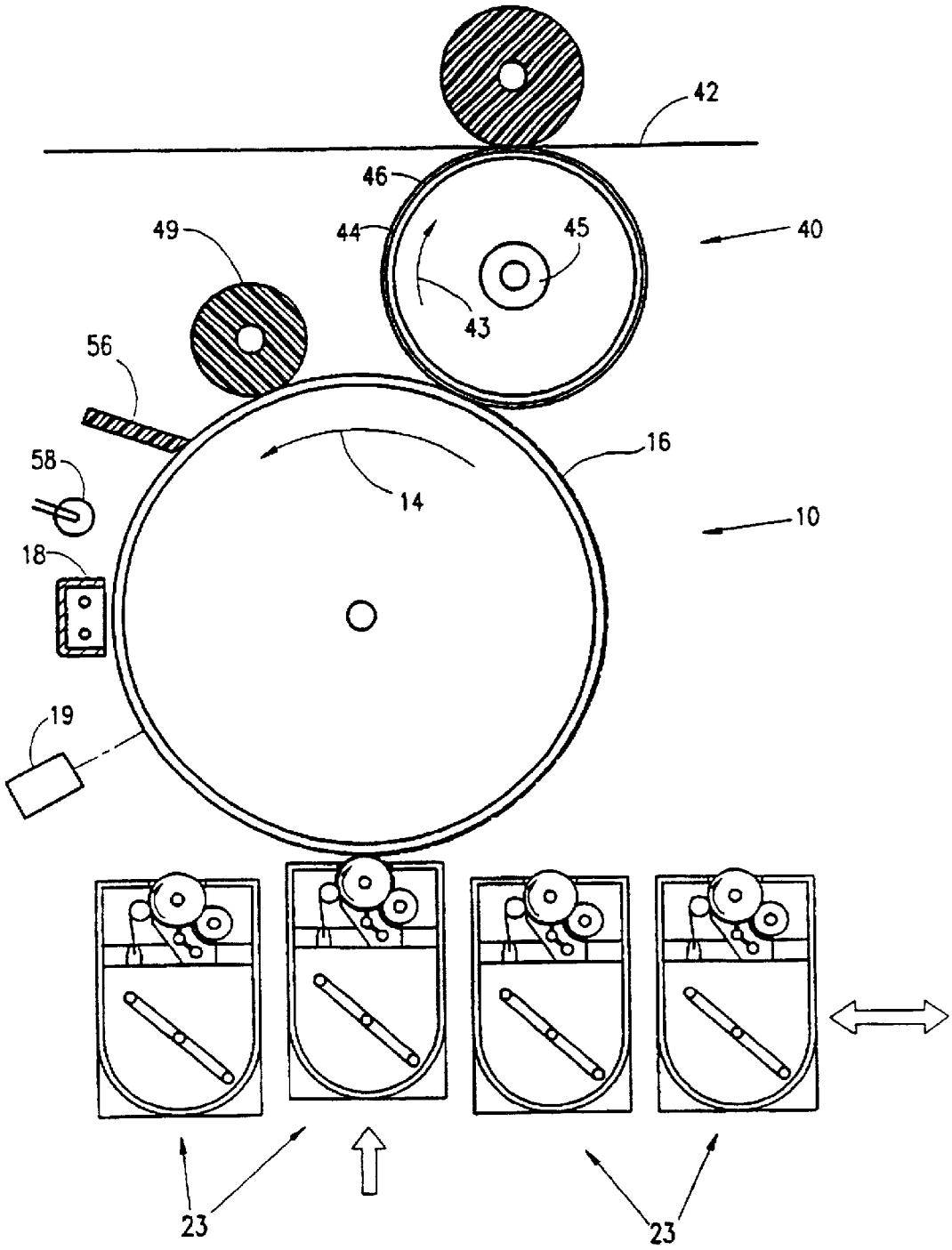

Alternatively, as shown in FIG. 2B, the plurality of toning assemblies 23 may be positioned side by side as for example on a chassis (not shown). The toning assembly containing the desired color for printing is brought into alignment by moving the chassis sideways as indicated in the drawing. The toning assembly to be used is then urged against drum 16 by a spring or other means (not shown).

In one preferred mode of operation, hereinafter referred to as the binary mode, attracted portions of the toner layer are completely transferred to the photoreceptor surface. Alternatively, in another preferred mode of operation, hereinafter referred to as the quasi-binary mode, the selective transfer of toner from surface 21 to surface 16 is only partial. The quasi-binary mode is achieved when the voltage difference between the image portions and the voltage of surface 21 is relatively low and/or the developed mass per unit area (DMA) on surface 21 is relatively large (typically 0.2 milligram per square centimeter). However even in the quasi-binary mode, the resultant DMA on surface 16 is strongly dependent upon the DMA on surface 21 of toning roller 22.

For the quasi-binary system, the difference in potential (i.e. the voltage) between the image areas on surface 16 and surface 21 is chosen so that only the desired amount of charged toner particles are transferred to charged portions of surface 16. In this system the voltage and the total charge on the particles in the toner layer are chosen such that the direction of the electric field reverses itself within the layer. That portion of the layer which is between the reversal plane and surface 16 will be attracted to surface 16 and the rest of the layer will be attracted to surface 21 If the viscosity and cohesiveness of the layer art not too high, the layer will split along the reversal plane. Providing the charge per unit mass is kept constant, the DMA which is transferred to surface 16 will be more uniform then that on surface 21. However, the DMA on imaging surface 16 is dependent on the thickness and DMA of the layer on surface 21.

The latent image toned by means of the processes described above may then be directly transferred to a desired substrate in a manner well known in the art. Alternatively as shown in FIG. 1, there may be provided an intermediate transfer member 40, which may be a drum or belt and which is in operative engagement with photoconductive surface 16 of drum 10 bearing the developed image. Intermediate transfer member or rotates in a direction opposite to that of photoconductive surface 16, as shown by arrow 43, providing substantially zero relative motion between their respective surfaces at the point of image transfer.

Intermediate transfer member 40 receives the toner image from photoconductive surface 16 and transfers it to a final substrate 42, such as paper. A heater 45 may be disposed internally of intermediate transfer member 40, to heat intermediate transfer member 40, as is known in the art. Transfer of the image to intermediate transfer member 40, is preferably aided by providing electrification of intermediate transfer member 40 to provide an electric field between intermediate transfer member 40 and the image areas of imaging surface 16. Intermediate transfer member 40, preferably has a conducting layer 44 underlying an elastomer layer 46, which is preferably a slightly conductive resilient polymeric layer.

Various types of intermediate transfer members are known and are described, for example in U.S. Pat. No. 4,684,238, PCT Publication WO 90/04216 and U.S. Pat. No. 4,974,027, the disclosures of all of which are incorporated herein by reference.

In a preferred embodiment of the invention the various layers of intermediate transfer member 40 are formed by the following method:

FORMULATION

Blend A is prepared by diluting 100 grams of adhesive (preferably Chemlok 218 distributed by Lord Chemical) with 100 grams of MEK solvent. 5.2 grams of conductive carbon black (preferably Printer XE2, distributed by Degussa). The mixture is charged into an 01 attritor (Union Process) and ground for 5 hours at 10° C.

Blend B is prepared by mixing 30 grams of SylOff 7600 (Dow Corning with 3 grains of SylOff 7601 (Dow Corning) and 450 grams of n-Hexene and shaking the mixture well.

Blend C is prepared by blending 90 grams of Polyurethane resin (Monotane A20) with 90 grams of Monotone A30 (C.I.L., England) and heating and stirring the blend undo vacuum at 80° C., for 16 hours and at 120° C., for an additional hour.

MANUFACTURING PROCESS

A metal core for the intermediate transfer member is coated with the required layers by the following process:

The metal core is painted with a thin layer of Blend A and dried for one hour at 110° C., The inner side of a mold having a diameter approximately 4 millimeters larger than the: core is dip coated with Blend B. The coated mend is cured for one hour at 110° C.

The coated mold and the coated core are preheated to 80° C. before casting. The hot mold is filled with hot (120° C.) Blend C. The core is carefully inserted into the mold and the system is cured for 8 hours at 135° C. Removal of the cured intermediate transfer member is aided by dripping Isopar I. (Exxon) or the inner side (edge) of the mold.

A 3 micrometer thick release layer is added to the intermediate transfer member by dip coating the member in RTV 236 dispersion (Dow Corning) and curing the layer.

The resulting layer has a thickness of approximately 2 millimeters and the resistivity of the Blend C material at 50° C. is about $10^{9}$ ohm-cm.

Following the transfer of the toner image in substrate 42 or to intermediate transfer member 40, photoconductive surface 16 engages a cleaning station 49, which may be any conventional cloning station. A scraper 56 completes the removal of any residual toner which may not have been removed by cleaning station 49. A lamp 58 then completes the cycle by removing any residual charge, characteristic of the previous image, from photoconductive surface 16.

In a preferred embodiment of the invention a pre-transfer discharge lamp (not shown) is used to reduce charge on the portion of the photoreceptor behind the toner (i.e., on the image portions), it being noted that the background portions are discharged during the formation of the latent image. This reduces the amount of arcing which occurs during transfer of the image to the intermediate transfer member. A preferred embodiment of a pre-transfer discharge lamp is disclosed in US. Pat. No. 5,166,734, the disclosure of which is incorporated herein by reference.

The present inventors have found that, if such a pre-transfer lamp is used and a roller charger is used for charger 18, then lamp 58 may be omitted.

Figure 3A:
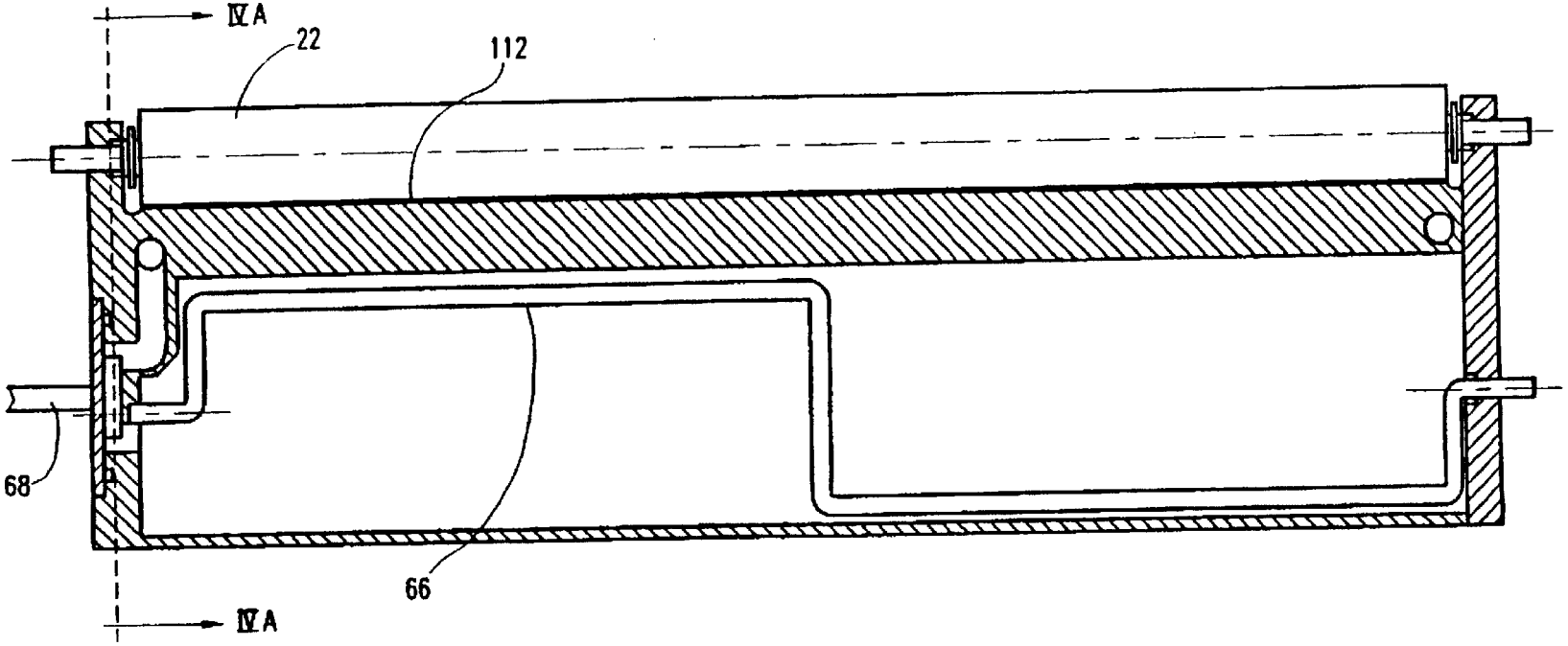
FIGS. 3A and 3B are schematic, cross-sectioned illustrations of a toning assembly in accordance with a preferred embodiment of the invention.
Figure 4B:
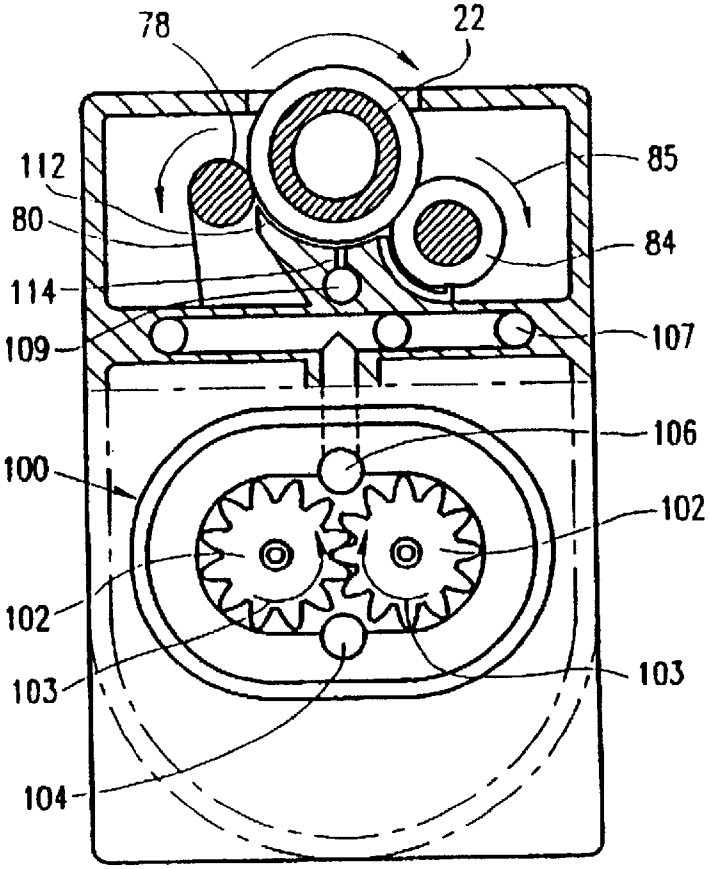
FIG. 4B is a schematic, cross-sectional view of the toning assembly of FIGS. 3A and 3B along line IV B.
Figure 4A:
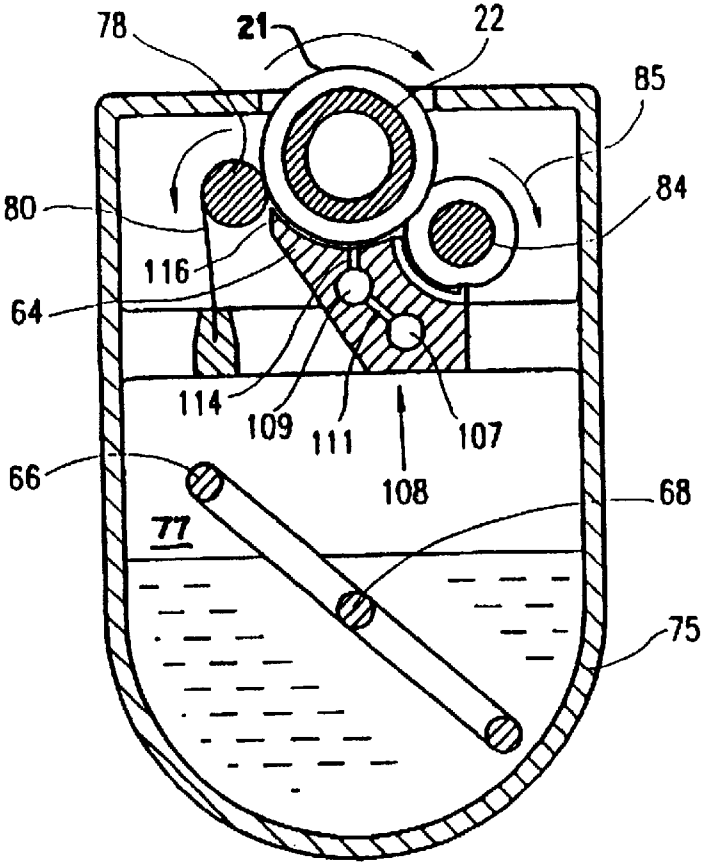
FIG. 4A is a schematic, cross-sectional view of the toning assembly of FIGS. 3A and 3B along line IV A.

Reference is now made to FIGS. 3A and 4A, which illustrate in more detail developer assembly 23 in accordance with a preferred embodiment of the present invention. In addition to toning roller 22, which has been described above, toning assembly 23 preferably includes a squeegee roller 78, a cleaning roller 84, an applicator 64 and an agitator 66, all contained within a preferably replaceable housing 75. The lower part 77 of housing 75, hereinafter referred to as a sump 77, is at least partially filled with liquid toner. All of the above mentioned elements contained in 75 are described below is greater detail.

In operation, agitator 66 rotates in a preselected direction constantly agitating the toner in sump 77, thereby ensuring the homogeneity of the toner throughout the toning process. Agitator 66 is preferably powered through an input shaft 68, as seen particularly in FIG. 3A. Input shaft 68 is preferably also associated with toner pumping apparatus which will be described in detail below.

Figure 3B:
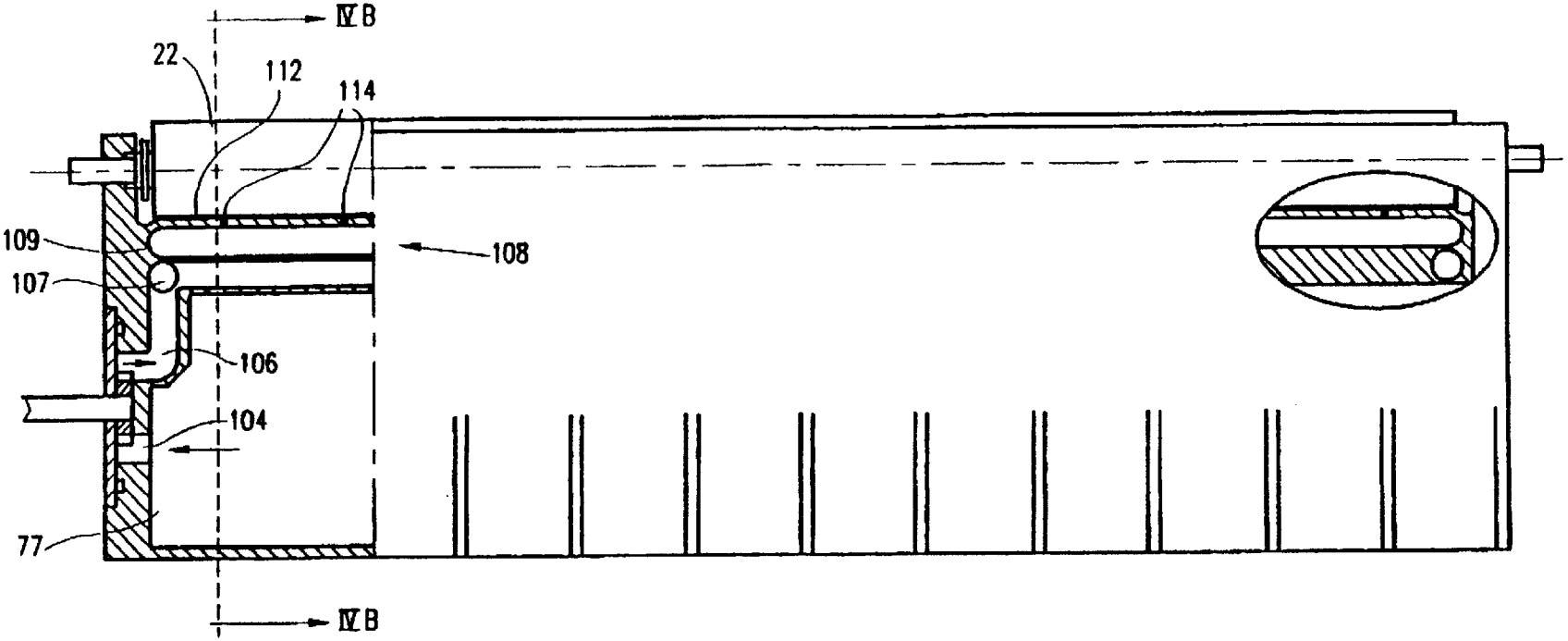

Reference is now also made to FIGS. 3B and 4B which illustrate additional portions of developer assembly 23 not seen in FIGS. 3A and 4A. Assembly 23 preferably includes a gear pump 100 having a pair of interlaced clogged gears 102 which rotate in opposite directions, as indicated generally by arrows 103. This rotation of gears 102 provides upward pumping action which pumps tone from an intake pipe 104, associated with sump 77, to an output pipe 106 associated with a toner application manifold 108 having a lower level 107 and an upper level 109. In a preferred embodiment of the invention, application manifold 108 is formed within applicator 64, which is preferably made of a rigid, non-conductive, preferably plastic, material. The upper surface 112 of applicator 64, i.e. the surface juxtaposed with surface 21 of toning roller 22, is preferably coated with a conductive layer. The conductive layer is preferably charged to a high voltage, preferably in the order of −1100 to −1200 volts. Surface 112 is hereinafter referred to as applicator electrode 112.

During operation of assembly 23, toner is pumped by pump 100 out of sump 77 and into application manifold 108. As seen in FIG. 3B pipe 106 connects pump 100 to lower level 107 of manifold 108, while FIG. 4A shows a toner passage 111 between lower level 107 and upper level 109. By virtue of the pressure produced at pump 100, the toner in upper level manifold 109 is released via a plurality of application tunnels 114, through applicator electrode 112 of applicator 64, into on application region 116 formed in the narrow space between roller 22 and electrode 112.

The voltage difference between electrode 112 and toning roller 22 causes repulsion of the charged toner particles in application region 116 from electrode 112 and attraction of the particles to toning roller 22, thereby coating toning roller 22 with a layer of concentrated liquid toner.

As shown in FIGS. 4A and 4B, squeegee roller 78 is situated near surface 21 of toning roller 22 and is preferably urged by a leaf spring 80 against surface 21. Squeegee roller 78 is preferably constructed of a rigid conductive material, optionally coated with a thin layer of polymer material, and is preferably biased by a voltage in the order of −1000 V. such that the outer surfer of squeegee 78 repels the charged particles of the toner layer on surface 21. The mechanical pressures and the electric repulsion of roller 78 are operative to squeegee the layer of toner, so that the layer of toner will be mere condensed and uniform as surfaces 21 of roller 22 comes into contact with image carrying surface 16.

Since coating region 116 preferably extends to the vicinity of squeegee roller 78, as can be seen in FIG. 4A, additional toner particles may be coated onto surface 22, in accordance with the voltage on squeegee roller 78. Thus, squeegee roller may also set as a coating electrodes. By adjusting the pressure applied by leaf spring 80 and by biasing the roller to an appropriate voltage, the thickness and density of the toner layer can be adjusted to a desirable level.

Squeegee roller 78 preferably rotates in a direction opposite that of toning roller 22, such that there is substantially zero relative motion between their respective surfaces at the region of contact. To one embodiment of the invention, the common surface spend of rollers 22 and 78 is approximately 2 inches per second, which preferably matches the speed of imaging surface 16.

The excess fluid which is removal by squeegee roller 78 is returned by gravity to sump 77 for reuse.

The solids content of the layer is mainly a function of the mechanical properties of the rollers and of the voltages applied and pressures and is only slightly influenced by the initial toner concentration for a considerable range of initial toner concentrations.

Figure 6:
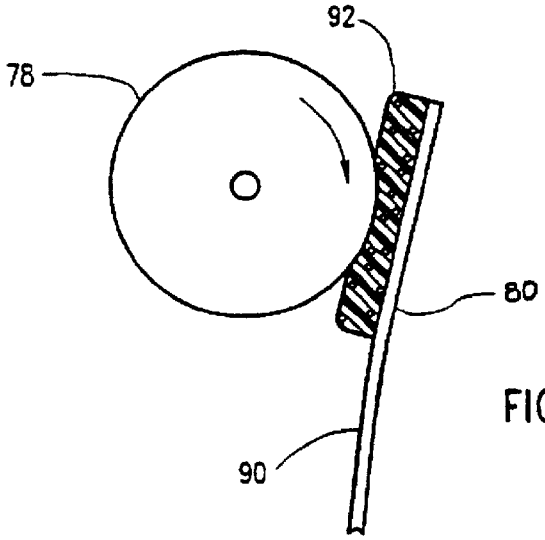
FIG. 6 is a more detailed schematic illustration of a portion of the assembly of FIGS. 3A–4B, is accordance with a preferred embodiment of the present invention.

Reference is now made to FIG. 6, which illustrates in more detail squeegee roller 78 urged by leaf spring 50. Leaf spring 50 preferably includes a relatively rigid metal spring body 90 and a relatively soft, preferably compressible, pad 92. Pad 92 is attached to spring body 90 at the portion of leaf spring 80 which urges roller 78, such that direct contact between spring body 90 and roller 78 is avoided. It should be appreciated that pad 92 protects squeegee 78 from being scratched or otherwise damaged and, thus, extends the useful lifetime of squeegee 78. Pad 92 is preferably farmed of a resilient material, preferably a closed-cell foam or elastomer, such as Hydrine, Neoprene to Nitrile. A preferred material is a soft closed cell and hydrocarbon resistant material such as Epichlorohydrin elastomer available from Regumi, Petach Tikva, Israel.

It is a feature of a preferred embodiment of the present invention that scratching of squeegee roller 78 is prevented by virtue of pad 92. It should be noted that other techniques and/or apparatus tested in rise past have failed to prevent such wear of the squeegee. Even Teflon coating of the leaf spring has failed to provide adequate protection.

As described above, the layer of liquid toner which is deposited on surface 21 of roller 22 is selectively transferred to photoconductive surface 16 in the process of toning the latent image. In principle, the portions of the toner layer that have not been used in the development of the latent image need not be manual from toning roller 22. However, a cleaning station 84, comprising a sponge or a brush or similar apparatus, is preferably provided to remove the remaining toner concentrate from surface 21 of toning roller 22, especially if the toner is of a type which is discharged by the electric fields in the interface between the surfaces of toning roller 22 and surface 16. The toner so removed returns by gravity to sump for reuse after being remixed with the remaining liquid toner by agitator 66.

Cleaning station 82 (shown in FIGS. 4A and 4B) preferably comprises a sponge collar 84, which is preferably formed of a resilient open cell material, such as foamed polyurethane, roller 84 is situated such that it resiliently engages a portion of surface 21 between the transfer area (i.e. the area of surface 21 engaged by surface 16) and the application area, thereby removing residual toner from surface 21 before the application of new toner. In a preferred embodiment of the invention, sponge roller 84 rotates in the same direction as toning roller 22, as indicated generally by arrow 85, but at a surface velocity approximately 10 times higher than that of roller 22. For example, if surface 21 of toning roller 22 moves at a spend of 2 inches per second, the surface of roller 84 moves at approximately 20 inches per second. The relative motion between the two surface assists in soaping toner off surface 21.

It should be appreciated that the different parts of toning assembly 23, as described to detail above, may be constructed of inexpensive materials and contained in a plastic housing 75, such that the entire toning assembly can be replaced when the liquid toner is at the end of its useful lifetime. Thus, it is a feature of the present invention that the toning assembly may be disposable, in contrast to prior art liquid toner systems which are not generally suitable for being disposable apparatus.

Figure 5A:
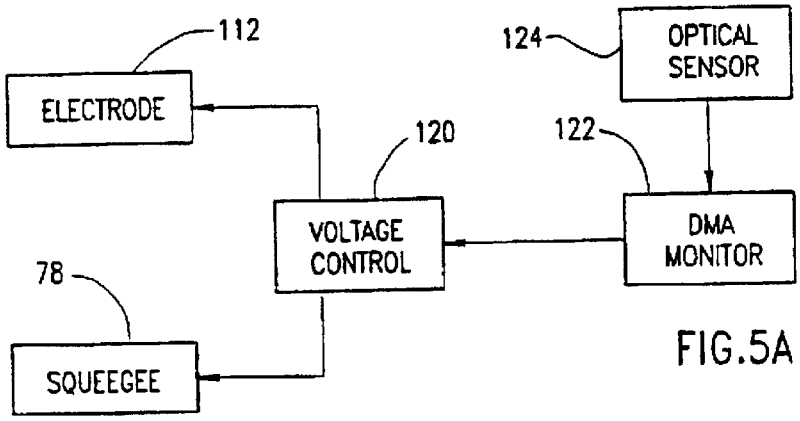
FIG. 5A is a simplified block diagram of toning control apparatus, in accordance with one aspect of the present invention.
Figure 5B:
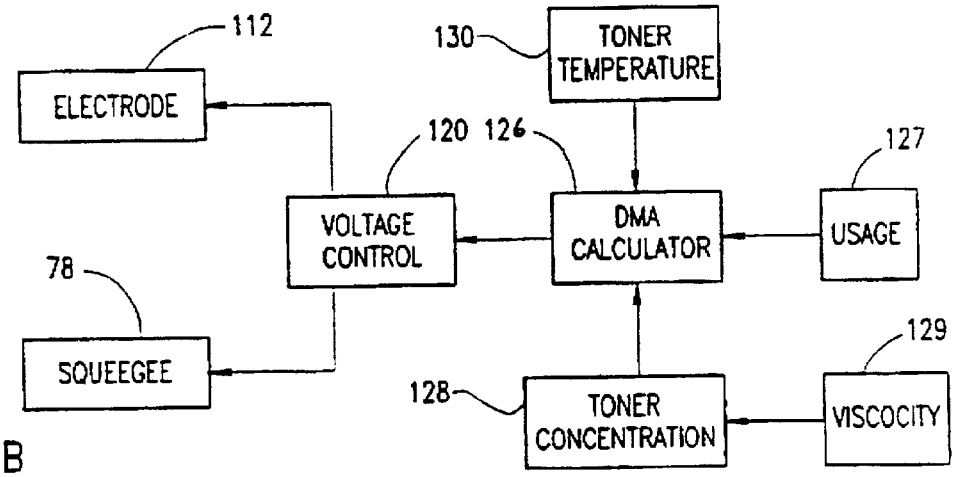
FIG. 5B is a simplified block diagram of toning control apparatus, in accordance with another aspect of the present invention.

Reference is now made to FIGS. 5A and 5B which are simplified block diagrams of two preferred embodiments of toner control apparatus in accordance with the present invention. FIG. 5A shows apparatus for controlling the DMA on the toning roller, based on measurement of the DMA on the toning roller or on the imaging surface. FIG. 5B shows apparatus for controlling the DMA based on measurements of physical properties of the toner which have been found to affect the DMA and/or calculation of toner properties based on usage of the cartridge.

In both embodiments, the toning control apparatus preferably includes a voltage control unit 120 operative for adjusting the voltage of one or both of application electrode 112 or squeegee roller 78. In the apparatus of FIG. 5A, the voltages are adjusted is accordance with signals received from a DMA monitor 122. DMA monitor 122 receives an input from a DMA sensor, which is preferably an optical sensor 124 such as infrared densitometer which views surface 21 of toning roller 22, imaging surface 16 or Intermediate transfer member 40. Optical sensor 124 is operative for generating an output, responsive to the optical density (OD) of the respective surface which is received by DMA monitor 122.

In a preferred embodiment of the invention, the DMA is optically measured on the intermediate transfer member. This measurement has been found to be more accurate than measuring the DMA in other places.

DMA monitor 122 preferably compares the output of optical sensor 124 to a pre-determined value which is indicative of the desired DMA required. While the optical density may be measured on either roller 21 or surface 16, either measurement may be rotated to a desired DMA and optical density on the imaging surface. If the optical density is measured on the imaging surface, a patch is generally toned on the imaging surface to act as a reference.

In the apparatus of FIG. 5B the voltages of squeegee roller 78 and electrode 112 are adjusted based on command signals received from a DMA calculate 126. In one preferred embodiment of the present invention, the DMA calculator includes a developer usage indicator 127 operative for providing calculate 126 with an indication responsive to the total area developed by development assembly 23, or to the number of copies/prints developed. The DMA calculator than determines, preferably by reference to an electronic "look-up table", the appropriate voltages of surface 112 and roller 78 to give the desired DMA.

Alternatively, the proportion of printed to non-printed area on each of the cycles is calculated and the amount of carrier liquid and toner particles per page is determined. In this embodiment the concentration calculation would be improved over that of the previous embodiment.

In a preferred embodiment of the invention, the usage indicator and/or DMA calculator are at least partially comprised in a "smart chip" which is part of the cartridge. In this case the smart chip stores specific concentration information for the cartridge. This allows replacement of cartridges without having to reset any counts on the computer. For example, it is sometime useful to print with inks having special properties, such as fluorescent inks or non process color inks. Since these cartridges are used only intermittently and must be removed when another special color is to be printed, it is very useful to have the concentration information attached to the cartridge itself.

The accuracy of the calculation of toner particle usage may be improved by using the DMA measurement to more accurately determine the amount of toner particles per unit printed area. A level detector in the sump may be used to determine the amount of liquid toner which has been removed from the sump. This determination, together with the determination of the amount of toner particles used is printing can be used to give a very accurate determination of the concentration.

The DMA is a function of the charge per unit mass of the toner, the solids concentration and the temperature. Therefore, in an alternative embodiment of the invention, the develops usage indicator is replaced by a toner concentration sensor 128 which provides an electric output responsive to the solids concentration in the liquid toner. Toner concentration sensor 128 may include a toner viscosity senses 129 which may be a differential pressure sensor. Alternatively, the concentration sensor may include an optical sensor for measuring the optical density of the tone in the sump, as ultrasonic sensor or a permitivity sensor for measuring properties of the toner concentrate which are related to the solids concentration in the sump.

The toner temperature affects both the viscosity and charge density (Q/M) of the toner and, thus, the DMA. Therefore, in a preferred embodiment of the invention, the development control system includes a toner temperature sensor 130, preferably located ice the tone sump. Temperature sensor 130 provides DMA calculator 126, in the embodiment of FIG. 5B with an electric input responsive to the temperature of the liquid toner. The temperature input is used by calculator 126, using stored DMA vs. temperature data, in determining the control signals generated to voltage control unit 126.

FIGS. 7 and 8 illustrate the temperature dependence of the toner viscosity (in centipoise) and toner charge density (in microcoulomb per gram), respectively for the preferred toner. The curve marked "Marcol-82" in FIG. 7 is the temperature vs. viscosity curve for the carrier liquid used in the preferred tone. By using took up tables based on experimental graphs such as FIGS. 7 and 8, DMA monitor 122 (or calculator 126 performs the required temperature compensation.

Figure 9:
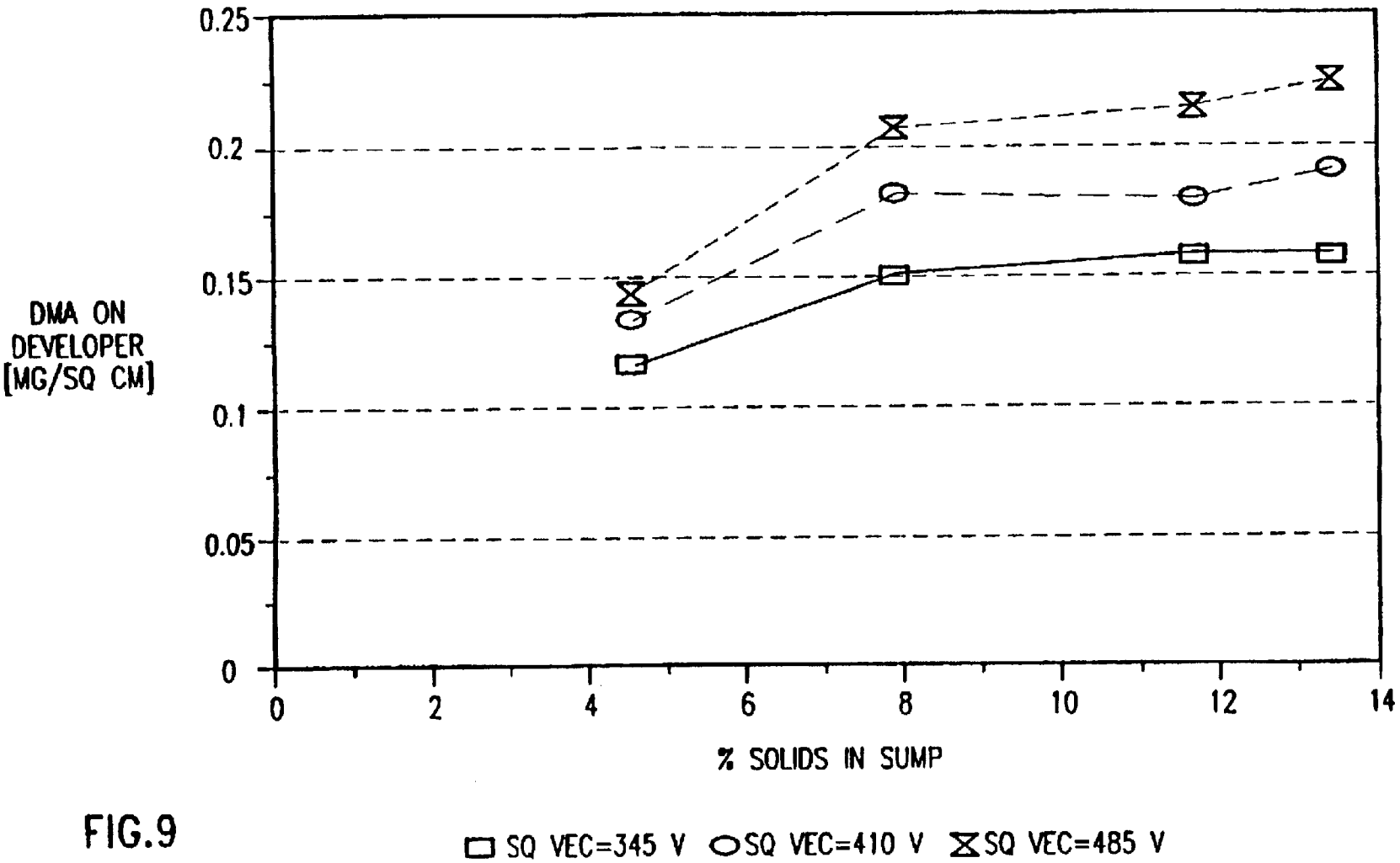
FIG. 9 is an experiment-based graph showing the dependents of DMA on toner concentration.

FIG. 9 is a graph of experimental data showing the relationship between the DMA (on toning roller 22) and the solids concentration in the toner for the preferred toner for various squeegee 78 to roller 22 voltage differences. As can be seen in FIG. 9, the DMA on roller 22 remains fairly stable over a wide range of toner concentrations but drops rapidly under a predetermined level of toner concentration. Thus, by including experiment-based look-up tables in the circuitry of DMA calculator 126, toner concentration data can be properly interpreted to corresponding DMA data.

Additionally, the charged and discharged voltage on the photoreceptor may be measure or calculated (based on usage of the photoreceptor) using methods which are well known in the art. The charging voltage may then be adjusted as may be the voltage of roller 22. This generally requires the adjustment of the applicator and squeegee voltages as well. It is also possible to use the applicator and squeegee voltage to compensate for aging effects is the photoreceptor.

It is a feature of a preferred embodiment d the present invention that liquid toner can be used ova a wide range of concentrations. By proper compensation of the voltages of squeegee roller 78 and electrode 112, the DMA on toning roller 22 (and hence of imaging surface 16) can be maintained substantially constant. This can be appreciated from FIG. 9, where it is seen that differences in the voltage between squeegee roller 78 and toning roller 22 result in corresponding difference in the DMA on roller 22.

A preferred toner for use in the invention is prepared as follows:

COMPOUNDING 865.4 grams of Surlyn 1605 ionomer (DuPont), 288.5 grams of Mogul-L (Cabot), 28.8 grams of copper Phtalocynin (Cookson Pigments) and 17.3 grams of Aluminum tristearate (Merck) are compounded on an Idon two roll mill at 150° C., for 40 minutes.

SOLUBILIZATION 1000 grams of the result of the compounding step and 1500 grams of Marcol 82 mineral oil (EXXON) are charged into a Ross double planetary mixer (two gallon size), preheated to 200° C., (hot oil heating). The material is heated without mixing for one hour. Mixing is then started as low speed (speed control setting 2) for 50 minutes, then raised to a higher speed (SCD 4) for an additional 50 minutes. By this time the material is completely solubilized and homogeneous. The material is discharged from the mixer while still warm After cooling the material is passed though a cooled meat grinder three times.

SIZE REDUCTION 862.5 grams of ground material from the previous step (at 40% non-volatile solids concentration) and 1437.5 grams of Marcol 82 are loaded into a 1S attritor (Union Process) equipped with 3/16 " carbon steel balls. The mixture is ground at 250 RPM for 30 hours at 55° C. The material is manually recycled through the system three times. The material is then diluted to the required concentration (normally 8–12% non-volatile solids) with Marcol 82 and screened through a 300 micrometer screen. The material is magnetically treated to remove metal contamination as is known in the art.

CHARGING

The resulting concentrated toner is charged with the following combination of materials.

1-Lubrizol 890 (Lubrizol Corporation) is added at a level of 80 milligrams per gram solids and 1 milligram per gram of Marcol 82; and 2-Petronate L (Witco) is added at a level of 20 milligrams per gram solid. The system is left to equilibrate overnight before use.

Other color liquid toners are produced by a similar process.

It will be appreciated by persons skilled in the art that the present invention is not limited to what has been particularly shown and described hereinabove. Rather, the scope of the present invention is defined only by the following claims:

We claim:

1. Toning apparatus for toning an electrostatic latent image, having image and background portions at different potentials, on an imaging surface comprising:

a source of liquid develops having a given concentration of toner material;

an toning surface, coated wilt a layer of concentrated liquid developer having a higher toner concentration than the given concentration and derived from the source of liquid develops and engaging the imaging surface at a toning region;

a source of voltage connected to the toning surface and electrifying the toning surface to a voltage operative to selectively transfer at least a portion of the layer to image portions on the imaging surface; and a developed mass per unit area controller having an input indicative of the mass of tone material per unit area (DMA) on the imaging surface and operative to adjust the DMA on the toning surface, without changing the given concentration, in response to the input.

2. Apparatus according to claim 1 further comprising:

an applicator which receives liquid developer from the source and coats a layer of said concentrated liquid developer having a toner concentration greater than said given concentration onto the toning surface.

3. Apparatus according to claim 2 wherein the applicator includes an applicator electrode charged to an applicator cottage which affects the DMA of the coating said applicator voltage being controlled by the controller, whereby the controller is operative to control the DMA on the imaging surface.

4. Apparatus according to claim 2 and also comprising:

a squeegee roller associated with the toning surface and charged to a squeegee voltage different from that of the toning surface, said squeegee voltage being controlled by the controller, whereby the controller is operative to control the DMA on the imaging surface.

5. Apparatus according to claim 4 and further comprising a leaf spring fixedly mounted on a first end portion thereof and having a resilient pad mounted on a second end portion thereof, said resilient pad being urged against said squeegee roller by said leaf spring thereby urging the squeegee roller against said toning surface.

6. Apparatus according to claim 1 and further comprising a DMA sensor which provides to the controller input a signal responsive to the DMA of the coating on the toning surface.

7. Apparatus according to claim 1 and further comprising a DMA censor which provides a signal to the controller input responsive to the DMA of an image area on the imaging surface.

8. Apparatus according to claim 6 wherein the DMA sensor comprises an optical sensor associated with the toning surface for measuring the optical density on a pre-selected portion of the toning surface.

9. Apparatus according to claim 1 and further comprising a solids concentration sensor which provides a signal to the controller input responsive to the solids concentration of the liquid developer in the source.

10. Apparatus according to claim 2 and further comprising a temperature sensor, operative for providing an output signal to the controller input responsive to the temperature of the liquid developer in the source.

11. Apparatus according to claim 9 wherein the solids concentration sensor comprises a viscosity sensor.

12. Imaging apparatus comprising:

an imaging surface having a latent electrostatic image thereon; and toning apparatus according to any of the preceding claims operative for toning the image portions of the late image with a layer of liquid developer.

13. Imaging apparatus according to claim 12 wherein the imaging surface is a photoconductive surface and further comprising:

a charging station operative for charging the photoconductive surface to a first voltage; and an exposure station operative for selectively discharging portions of the charged photoconductive, thereby creating a latent image comprising image portions at a first voltage and background portions at a second voltage.

14. A replaceable toning cartridge comprising:

a housing adapted for mounting on a toner station of as imaging apparatus in operative association with an imaging surface thereof; and toning apparatus according to claim 1 contained in said housing.

15. Apparatus according to claim 3 and comprising:

a squeegee roller associated with the toning surface and charged to a squeegee voltage different from that of the toning surface, said squeegee voltage being controlled by the controller, whereby the controller is operative to control the DMA on the imaging surface.

16. Apparatus according to claim 15 and comprising a DMA sensor which provides to the controller input a signal responsive to the DMA of the coating on the toning surface.

17. Apparatus according to claim 15 and comprising a DMA sensor which provides a signal to the controller input responsive to the DMA of an image area on the imaging surface.

18. Apparatus according to claim 3 and comprising a DMA sensor which provides to the controller input a signal responsive to the DMA of the coating on the toning surface.

19. Apparatus according to claim 3 and comprising a DMA sensor which provides a signal to the controller input responsive to the DMA of to image area on the imaging surface.

20. Apparatus according to claim 2 and comprising a DMA sensor which provides to the controller input or signal responsive to the DMA of the coating on the toning surface.

21. Apparatus according to claim 4 and comprising a DMA sensor which provides to the controller input a signal responsive to the DMA of the coating on the toning surface.

22. Apparatus according to claim 2 and comprising a DMA sensor which provides a signal to the controller input responsive to the DMA of an image area on the imaging surface.

23. Apparatus according to claim 4 and comprising a DMA sensor which provides a signal to the controller input responsive to the DMA of en image area on the imaging surface.

24. Imaging apparatus comprising:

an imaging surface having a latent electrostatic image thereon;

toning apparatus according to claim 6 operative for toning the image portions of the latent image with a layer of liquid developer; and an intermediate transfer member which receives the toned image from the: imaging surface and transfers it to a further surface, wherein the DMA sensor comprises an optical sensor associated with the toning surface for measuring the optical density on a preselected portion of the toning surface.

25. Squeegeeing apparatus for use in liquid imaging to squeegee an endless moving surface, comprising:

a squeegee roller having a squeegee surface associated with said endless moving surface, and a source of pressure applied to a central portion of the squeegee surface and arranged such that the pressure urges the squeegee surface against said endless surface.

26. Apparatus according to claim 25 wherein the source of pressure is a leaf spring mounted on a first end thereof and having a second end thereof urged toward the squeegee roller.

27. Apparatus according to claim 26 and including a resilient pad mounted on said second end thereof, said resilient pad being urged against the squeegee surface by said leaf spring.

*28. Toning apparatus for toning an electrostatic latent image, having image and background portions at different potentials, on an imaging surface comprising:*

*a toning surface, coated with a layer of concentrated liquid developer having a toner layer thickness, engaging the imaging surface at a toning region;*

*a source of voltage connected to the toning surface and electrifying the toning surface to a voltage operative to selectively transfer a portion, but not all, of the thickness to image portions on the imaging surface.*

*29. Apparatus according to claim 28 wherein the voltage is such that substantially none of the layer is transferred to background portions on the imaging surface.*

*30. Apparatus according to claim 28 and including:*

*a source of liquid developer having a concentration of toner particles; and*

*an applicator that receives liquid developer from the source and coats said layer of concentrated developer on the toner surface, said layer having a greater concentration of toner particles than the liquid developer received from the source.*

*31. Apparatus according to claim 30 wherein the applicator includes an applicator electrode charged to an applicator voltage which affects the mass of toner material per unit area (DMA) of the coating.*

*32. Apparatus according to claim 31 and including a controller that controls the applicator voltage, thereby to control the toner layer thickness.*

*33. Apparatus according to claim 32 and comprising:*

*a squeegee roller associated with the toning surface and charged to a squeegee voltage different from that of the toning surface, said squeegee voltage being controlled by the controller, whereby the controller is operative to control the DMA on the toning surface.*

*34. Imaging apparatus comprising:*

*an imaging surface having a latent electrostatic image formed thereon; and*

*toning apparatus according to any of claims 28–33 operative for toning the image portions of the latent image with said concentrated liquid developer.*

* * * * *